United States Patent
Dwelly et al.

(10) Patent No.: US 7,142,153 B2
(45) Date of Patent: Nov. 28, 2006

(54) SHORT PULSE/STEPPED FREQUENCY RADAR SYSTEM

(75) Inventors: Wesley H. Dwelly, Sahuarita, AZ (US); Vinh N. Adams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/863,623

(22) Filed: Jun. 8, 2004

(65) Prior Publication Data

US 2005/0270219 A1    Dec. 8, 2005

(51) Int. Cl.
G01S 13/26 (2006.01)
G01S 7/28 (2006.01)
G01S 13/00 (2006.01)

(52) U.S. Cl. .......... 342/131; 342/22; 342/82; 342/89; 342/118; 342/128; 342/130; 342/132; 342/175; 342/192; 342/194; 342/195; 342/196

(58) Field of Classification Search .......... 342/21, 342/22, 27, 28, 118, 130–144, 175, 202–205, 342/82–103, 129, 192–197, 128; 375/130–153
See application file for complete search history.

(56) References Cited

U.S. PATENT DOCUMENTS

| | | | |
|---|---|---|---|
| 3,940,696 A | 2/1976 | Nagy et al. | |
| 4,450,444 A * | 5/1984 | Wehner et al. | 342/194 |
| 4,527,161 A * | 7/1985 | Wehner | 342/196 |
| 4,538,149 A * | 8/1985 | Wehner | 342/194 |
| 4,547,775 A * | 10/1985 | Wehner et al. | 342/194 |
| 4,559,537 A | 12/1985 | Pearson, Jr. et al. | |
| 4,562,439 A | 12/1985 | Peralta et al. | |
| 4,652,882 A | 3/1987 | Shovlin et al. | |
| 5,325,095 A * | 6/1994 | Vadnais et al. | 342/22 |
| 5,406,842 A * | 4/1995 | Locke | 342/129 |
| 5,499,029 A * | 3/1996 | Bashforth et al. | 342/22 |
| 6,359,582 B1 * | 3/2002 | MacAleese et al. | 342/22 |
| 6,750,809 B1 * | 6/2004 | Cho et al. | 342/129 |

FOREIGN PATENT DOCUMENTS

GB    2249448 A *    5/1992

* cited by examiner

*Primary Examiner*—Bernarr E. Gregory
(74) *Attorney, Agent, or Firm*—Horace St. Julian; Leonard A. Alkov; Karl A. Vick

(57) ABSTRACT

A unique hardware architecture that combines short pulse, stepped frequency and centerline processing. The inventive architecture implements a radar system having a transmitter for transmitting short pulses, each pulse being stepped in frequency and a receiver receiving the pulses and providing an output signal in response thereto. In the illustrative embodiment, the transmitter includes a frequency source, an RF switch coupled to the source and a controller for controlling the RF switch. The receiver includes a signal processor implemented with a center line roughing filter. The signal processor has multiple channels each of which has a range gate and a digital filter. The digital filter includes a Fast Fourier Transform adapted to output a range Doppler matrix.

26 Claims, 5 Drawing Sheets

SHORT PULSE/STEPPED FREQUENCY RADAR SYSTEM

BACKGROUND OF THE INVENTION

1. Field of the Invention

The present invention relates to electrical and electronic circuits and systems. More specifically, the present invention relates to radar systems.

2. Description of the Related Art

See or Sense Through-the-wall (STTW) sensors and technologies are needed to satisfy current and future operational requirements for an enhanced capability to detect, locate, identify, and classify moving and stationary people or objects through walls, for clearing an urban facility in connection with military, police, security and/or commercial applications. The STTW sensor could be employed by soldiers or by robotic assets (air and ground) to provide detailed information on an occupied or unoccupied environment.

Prior approaches have involved impulse radar and swept frequency radar (CHIRP). Impulse radar transmits an ultra short pulse and can be processed with incoherent processing (detector) or coherent processing. The disadvantages of impulse radars are low average power and limited dynamic range. In addition coherent processing requires a tremendous processing load.

Swept frequency radar uses a mixing technique to convert range to frequency. This preserves an extremely high bandwidth (fine range resolution). Analog to digital bandwidth becomes range coverage and range resolution is the chirp frequency sweep bandwidth. Unfortunately high bandwidths require long frequency sweeps. This creates a minimum standoff range. To address this problem the linear frequency sweep is gated to create stepped frequency radar. One disadvantage of stepped frequency waveforms or any coded waveform is range sidelobes. Unfortunately, to discriminate small radar cross-sections that are close to large objects requires large dynamic range and low range sidelobes.

Finally, continuous wave radar systems have not proved effective for STTW applications. Hence, a need remains in the art for an improved radar for See Through the Wall applications.

SUMMARY OF THE INVENTION

The present invention addresses the "imaging through a wall" problem with a unique hardware architecture that combines short pulse, stepped frequency and centerline processing. The inventive architecture implements a radar system having a transmitter for transmitting short pulses, each pulse being stepped in frequency and a receiver receiving the pulses and providing an output signal in response thereto.

In the illustrative embodiment, the transmitter outputs pulses less than or equal to 1 nanosecond rise or fall time and includes a frequency source, an RF switch coupled to the source and a controller for controlling the RF switch. In the illustrative embodiment, the controller causes the switch to switch between 3 and 20 nanoseconds.

The receiver includes a signal processor implemented with a center line roughing filter. The signal processor has multiple channels each of which has a range gate and an analog roughing filter. The analog outputs of each channel are multiplexed to a single analog to digital converter followed by a digital filter. The digital filter includes a Fast Fourier Transform adapted to output a range Doppler matrix. This novel approach should provide sufficient energy on target, minimize range side lobes, maintain high dynamic range and reduce processing data rates in clutter environment for STTW requirements.

BRIEF DESCRIPTION OF THE DRAWINGS

FIG. 1b illustrates the output of the transmitter of FIG. 1a.

FIG. 1d is a diagram which shows an illustrative stepped frequency transmitted waveform output by the transmitter of FIG. 1a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
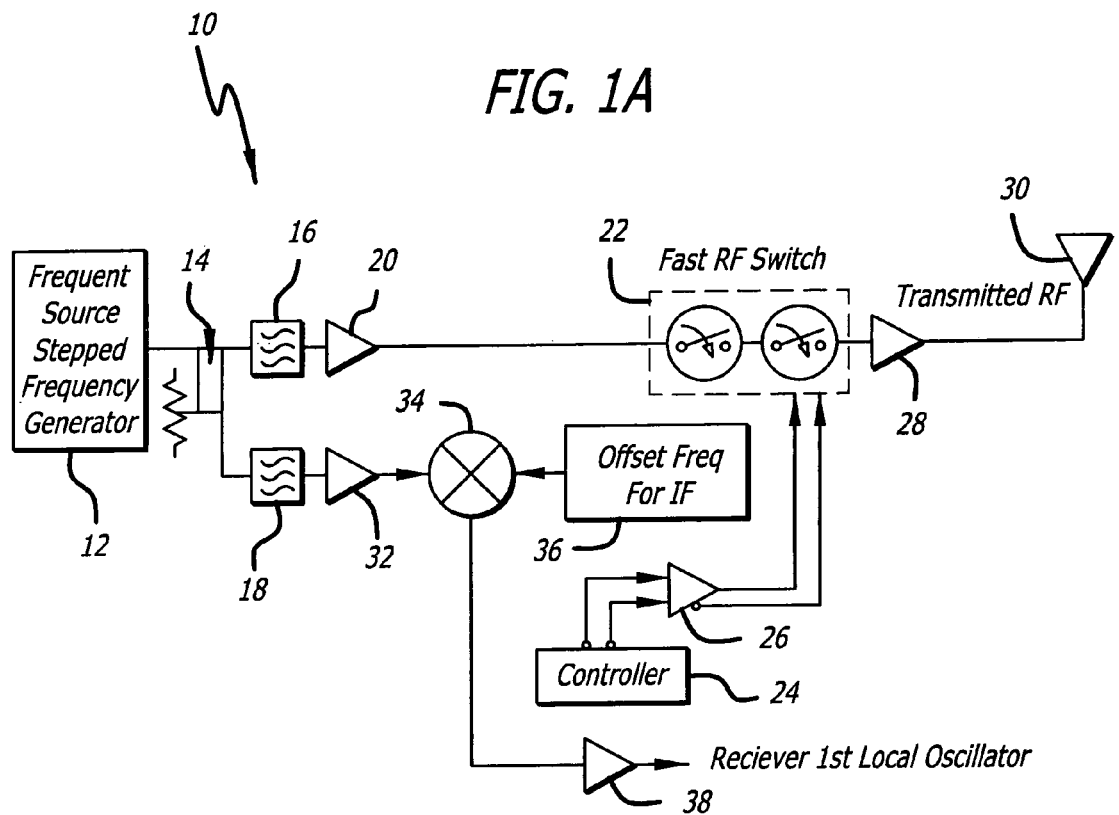
FIG. 1a is a simplified block diagram of an illustrative implementation of a radar transmitter in accordance with the teachings of the present invention.

FIG. 1a is a simplified block diagram of an illustrative implementation of a radar transmitter in accordance with the teachings of the present invention. The transmitter 10 includes a frequency source generator 12 designed to generate a range of frequencies in accordance with the present teachings. The source generator 12 may be implemented in accordance with conventional teachings, e.g., with a phase locked loop and a divider circuit. The signal output by the generator 12 feeds a power splitter which, in turn, feeds first and second filters 16 and 18. The output of the first filter is fed to an RF switch 22 via a first amplifier 20. The switch should be capable of switching sufficiently fast to generate a pulse sufficiently short (e.g. less than one nanosecond rise and fall times) for the requirements of a given application. The switch 22 is controlled by a pulse from a controller 24 provided by switch driver 26. In the illustrative embodiment, the controller 24 causes the switch to switch between 3 and 20 nanosecond RF pulses. The output of the switch 22 is fed to an antenna 30 after amplification by a second amplifier 28.

The output of the second filter 18 is fed to a mixer 34 via a third amplifier 32 by which it is mixed with an offset frequency, provided by a source 36, and fed to a receiver circuit (not shown) as a local oscillator signal via a fourth amplifier 38.

The present invention addresses the "imaging through a wall" problem with a unique hardware architecture that combines short pulse, stepped frequency and centerline processing. This novel approach should provide sufficient energy on target, minimize range side lobes, maintain high dynamic range and reduce processing data rates in clutter environment to meet the needs of current and near term STTW requirements.

Thus, in accordance with the present teachings, the transmitter 10 outputs a plurality of bursts, each burst having a plurality of pulse trains, each pulse train being stepped in frequency relative to the preceding pulse train and comprising a plurality of pulses. This is illustrated in FIGS. 1b and 1d below.

Figure 1B:
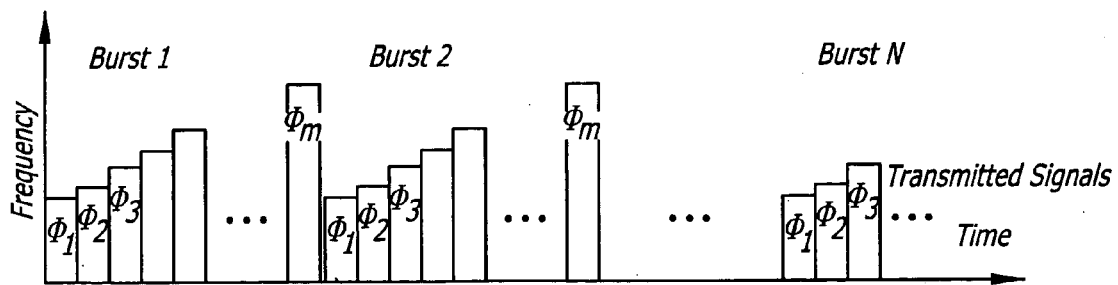

FIG. 1b illustrates the output of the transmitter of FIG. 1a. As illustrated in FIG. 1b, the transmitter 10 sends out a train of bursts 1 . . . N, with each burst having train of pulses $\phi_1$–$\phi_M$.

Figure 1C:
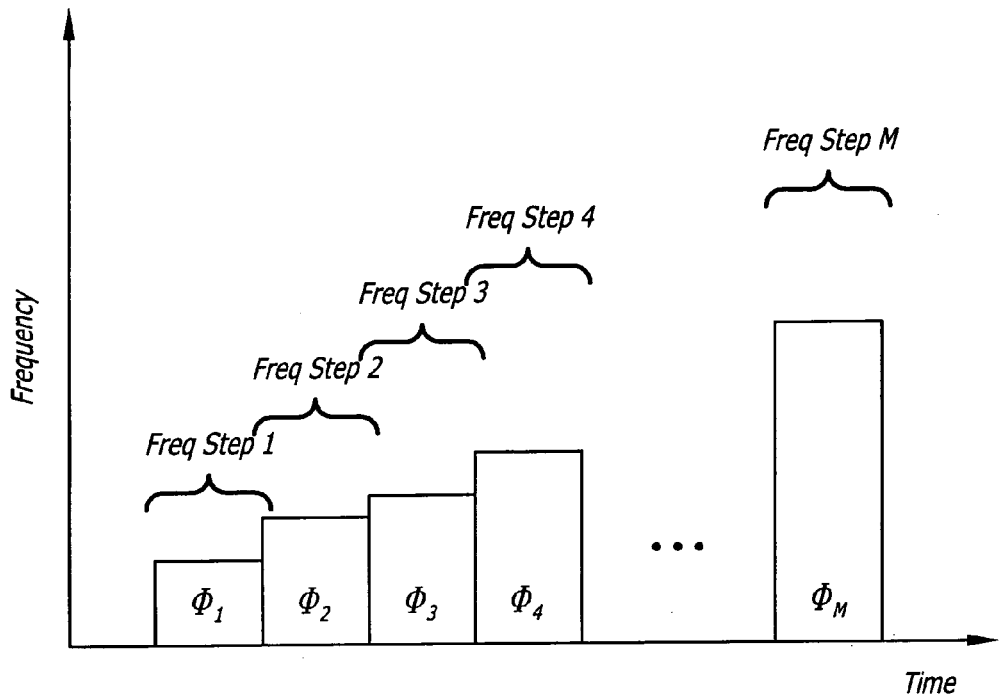
FIG. 1c is a magnified view of a single burst of the train of bursts shown in FIG. 1b.

FIG. 1c is a magnified view of a single burst of the train of bursts shown in FIG. 1b. As shown in FIG. 1c, each burst is comprised of a train of pulses $\phi_1$–$\phi_M$ with each of the pulses being of a unique frequency. Further, as shown in FIG. 1c, each of the pulses is stepped in frequency relative to the preceding pulse. This is illustrated in FIG. 1d.

Figure 1D:

FIG. 1d is a diagram which shows an illustrative stepped frequency transmitted waveform output by the transmitter of FIG. 1a. As discussed above, the disadvantage of stepped frequency waveforms, or any coded waveform, is range side lobes. Even theoretically low side lobe codes typically suffer from dynamic and static errors creating non-ideal side lobes. The ability to discriminate small radar cross-sections that are close to something large requires large dynamic range and low range side lobes. The stepped frequency waveform generates an ultra wide band (high range resolution) output signal. To reduce minimum standoff range and lower range side lobes the frequency steps should be very short. The short pulses require a wide instantaneous bandwidth to match filter the pulse. A/D sample rates become high to digitize the wide bandwidth. High sample rates reduce A/D dynamic range, increase data speed and increase the amount of data thus dramatically increasing the signal processing requirements of the radar system. The solution to this problem is center line processing.

Figure 2:
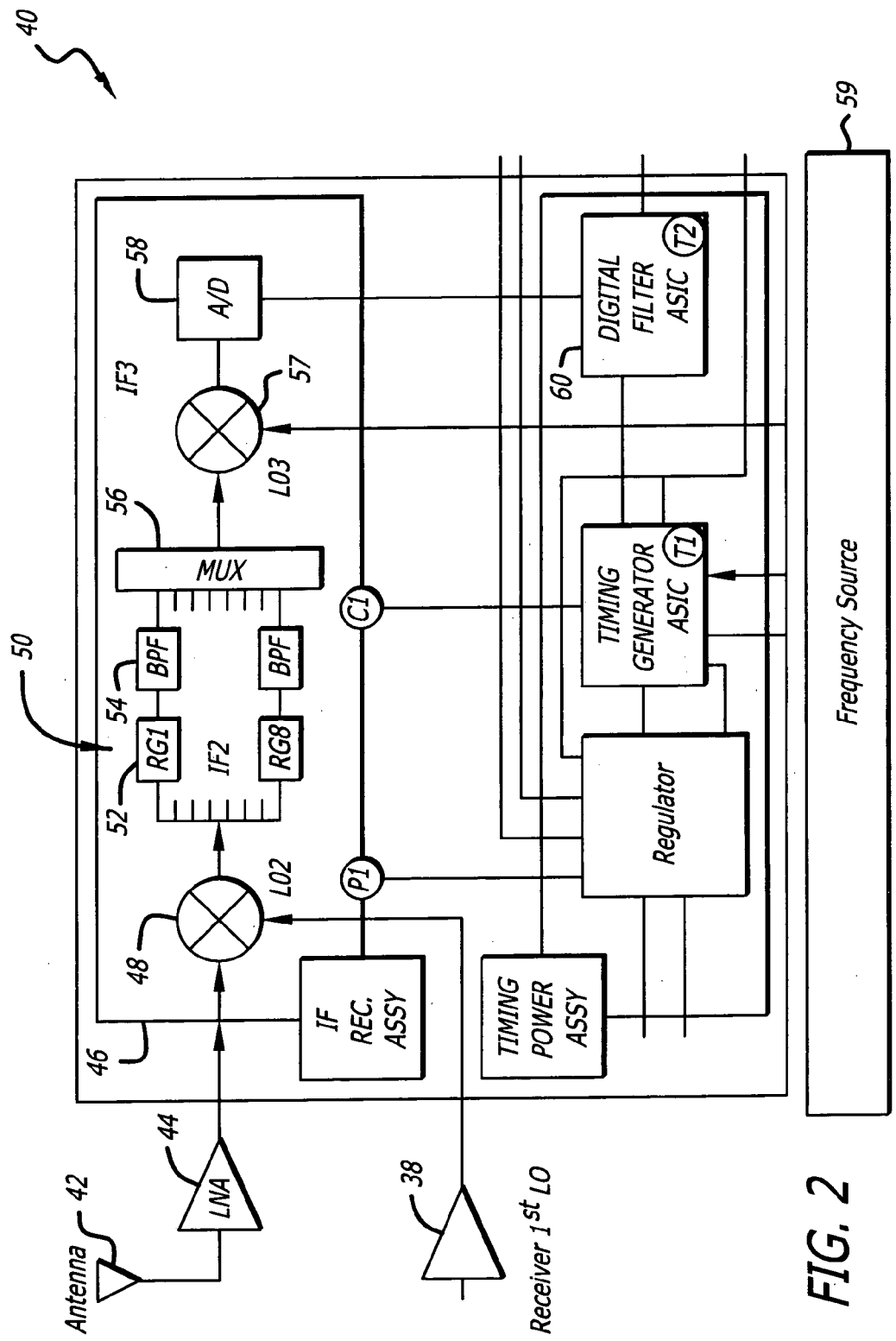
FIG. 2 is a simplified block diagram showing an illustrative implementation of a receiver in accordance with the present teachings.

FIG. 2 is a simplified block diagram showing an illustrative implementation of a receiver in accordance with the present teachings. The receiver 40 is hereinafter referred to as a centerline processing receiver (CPRX). As shown in FIG. 2, the CPRX receiver 40 is adapted to receive signals from a receive antenna 42 via a low noise amplifier 44. The output of the LNA is mixed with the local oscillator signal from the transmitter 10 via the amplifier 38 (FIG. 1) by a mixer 48 in the intermediate frequency (IF) receive assembly 46 of the receiver 40. The downconverted IF signals are sent to a plurality of signal processing channels 50 of which a single channel is shown in FIG. 3.

Figure 3:
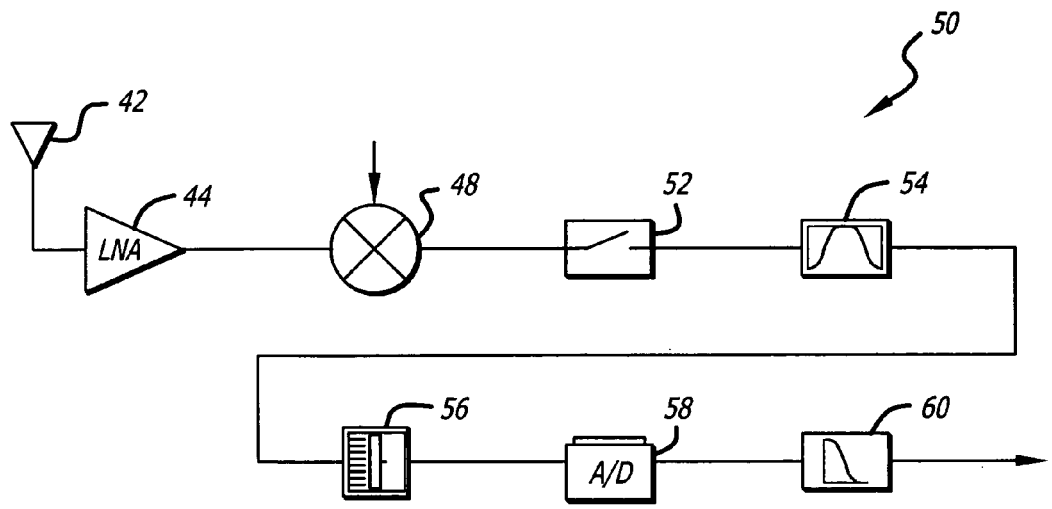
FIG. 3 is a simplified block diagram of an illustrative embodiment of a single channel of the signal processing circuit of FIG. 2.

FIG. 3 is a simplified block diagram of an illustrative embodiment of a single channel of the signal processing circuit of FIG. 2. As shown in FIG. 3, each channel includes a range gate 52. In the best mode, each range gate is programmably open for a commanded time interval and for a commanded delay relative to a transmit pulse. In the illustrative embodiment, the gate is commanded open for 7.4 nanoseconds (nsecs) and has a rise time of less than one nsec. The gated signal is filtered by a centerline roughing filter 54. The filter 54 may be a surface acoustic wave (SAW) filter. Preferably, the filter has a bandwidth which is narrow relative to the pulse repetition frequency (PRF) of the transmitter 10 and centered at the IF frequency. The filter 54 should have a continuous wave output to allow for a lower A/D sampling rate.

Returning to FIG. 2, in the illustrative embodiment, each of the signal processing channels (of which eight are provided in the example) is multiplexed onto a single line by a multiplexer 56. The output of multiplexer 56 is downconverted to baseband by a second mixer 57 (with a signal provided by a frequency source 59) and digitized by an analog to digital converter 58. The digital output of the A/D 58 is filtered and decimated by a digital filter 60 to reduce the data rate thereof. The digital filter is illustrated in FIG. 4.

Figure 4:
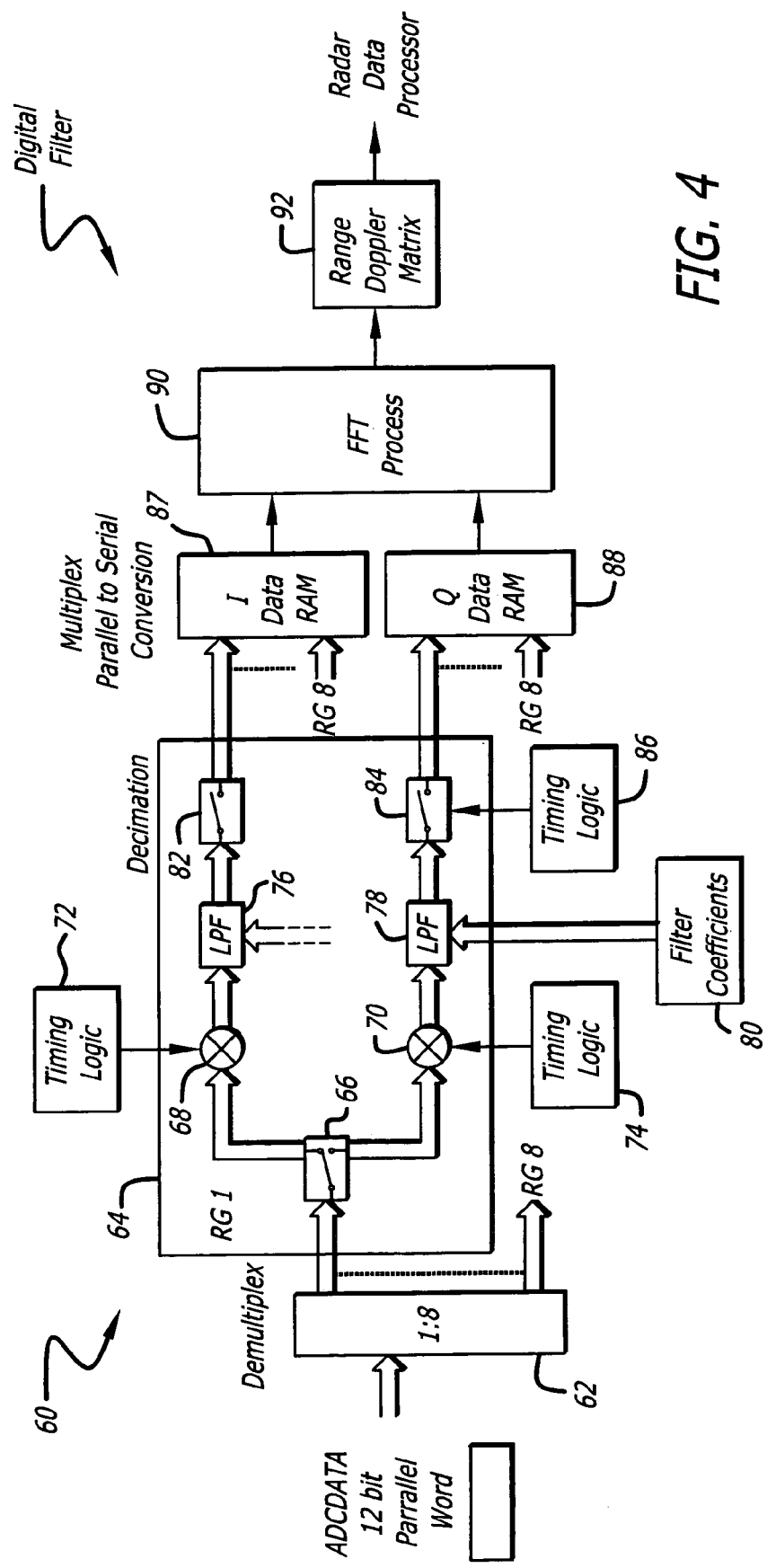
FIG. 4 is a simplified block diagram of an illustrative implementation of the digital filter.

FIG. 4 is a simplified block diagram of an illustrative implementation of the digital filter. The digital filter 60 includes a demultiplexer 62 which divides the receive stream into a number (8 in the illustrative embodiment) of channels. Each channel is fed to an associated decimation filter 64 of which only one is shown in FIG. 4. Each decimation filter includes a first switch 66 which functions as a single pole double throw switch and serves to provide I and Q signals. The I signal is fed to a first mixer 68 and the Q signal is fed to a second mixer 70. Each mixer is fed by timing logic which executes an algorithm for digital down conversion. The outputs of the mixers 68 and 70 are filtered by low pass filters 76 and 78 respectively. The filters are supplied with coefficients from a register 80. The outputs of the filters 76 and 78 as selectively switched by switches 82 and 84 under control of timing logic 86. The switches 82 and 84 serve to decimate the data. The digital filter outputs a plurality (e.g. 8192) inphase (I) and quadrature (Q) data samples. The inphase outputs of the channels are multiplexed to a single channel by a second multiplexer 87 and the quadrature outputs of the channels are multiplexed to a single channel by a third multiplexer 88. The I and Q signals are processed by an FFT (Fast Fourier Transform) 90 which outputs a range Doppler matrix (RDM) 92 for each scan. The output of the range Doppler matrix is fed to a radar data processor which combines RDMs for each scan into an image in a conventional manner. The pixel size should be dependent on the standoff range and antenna beam-width.

Figure 5A:
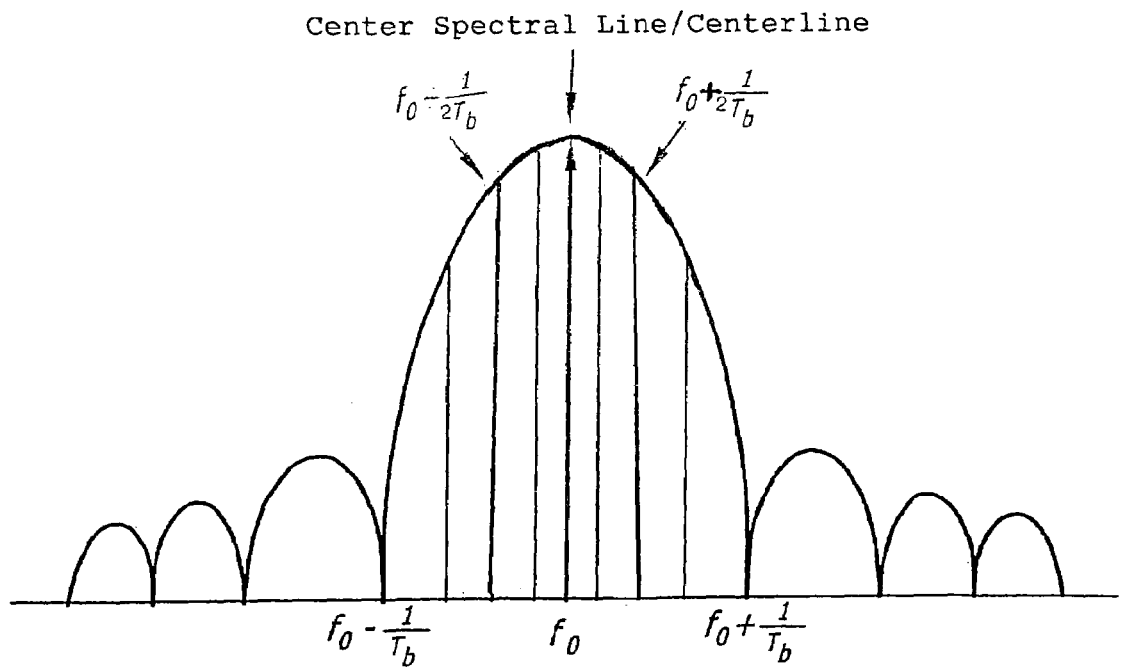
FIG. 5a is a graph which shows the passband used for centerline processing in accordance with the present teachings.

FIG. 5a is a graph which shows a typical radar pulse spectrum. The pulse spectrum consists of numerous spectral lines of energy with a null-to-null bandwidth of $f_o+1/T_b$ where $T_b$ is the pulse width. Current state of the art radar use a matched filter approach for pulsed systems. The matched filter approach processes the energy in all the spectral line within the 3 dB bandwidth or $f_o+\frac{1}{2}T_b$. The receiver of the present invention processes the energy within only one spectral line at the center of the frequency spectrum of the pulse. This is known in the art as the 'centerline'. See Introduction to Airborne Radar (2nd Edition) by G. W. Stimson SciTech Publishing (1998) p.230. Processing only the center spectral line is referred to as 'centerline processing' herein. The advantages of center line processing should be: 1) it significantly lowers the A/D converter data rate thus reducing required data processing power; 2) the lower received bandwidth is less susceptible to mutual interference and jamming; 3) the lower received BW provides more dynamic range; and 4) a high range resolution is maintained with analog range gates and step frequency.

Figure 5B:
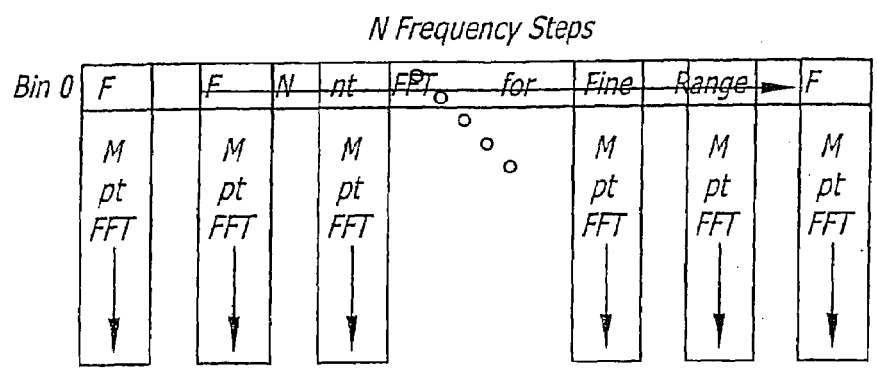
FIG. 5b is a diagram which illustrates FFT processing in accordance with the present teachings.

FIG. 5b is a diagram which illustrates FFT processing in accordance with the present teachings. The "M" point FFT represents performing FFT's on each burst of pulses for a Frequency Step. The "N" point FFT represents performing an FFT across bin "0" of the "M" point FFT's to provide step frequency Processing in accordance with present teachings.

The present invention should be compelling for STTW applications because the Doppler shifts in STTW applications are low. That is, people moving throughout a room should always be less than 5 mph. This time allows for multiple radar dwells, each at different frequencies to obtain a high range resolution. This requires dwell to dwell coherency. In radar systems, maintaining coherency over long periods of time can be an issue. This design uses one range gate to sample the transmitted pulse and force coherency over multiple radar dwells and frequency steps.

In the illustrative embodiment, the present invention uses a 1.1 meter pulse and 8 meters of range coverage with a 1 Mhz PRF. The illustrative embodiment uses a 12 bit 10 Mega Samples Per Second (MSPS) A/D and collects 8192 samples of I & Q. The conventional approach uses two 8 Bit 135 MSPS A/D's and collects 2 million samples of I and Q data.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A radar system comprising:
    first means for transmitting a train of short pulses, each pulse being stepped in frequency and
    second means for receiving said pulses and providing an output signal in response thereto, said second means including means for sampling said train of pulses at a centerline of a frequency spectrum of one of said pulses.
2. The invention of claim 1 wherein said first means outputs pulses less than or equal to 1 nanosecond in rise or fall time.
3. The invention of claim 1 wherein said first means includes a frequency source.
4. The invention of claim 3 wherein said first means further includes an RF switch coupled to said frequency source.
5. The invention of claim 4 wherein said first means further includes a controller for controlling said RF switch.
6. The invention of claim 5 wherein said controller activates said switch to switch between 3 and 20 nanosecond RE pulses.
7. The invention of claim 1 wherein said second means includes a signal processor.
8. The invention of claim 7 wherein said signal processor includes a filter.
9. The invention of claim 8 wherein said signal processor includes a range gate.
10. The invention of claim 7 wherein said second means includes a digital filter.
11. The invention of claim 10 wherein said digital filter includes a Fast Fourier Transform.
12. The invention of claim 11 wherein said Fast Fourier Transform is adapted to output a range Doppler matrix.
13. A radar system comprising:
    a transmitter adapted to transmit pulses less than or equal to 1 nanosecond in rise or fall time, each pulse being stepped in frequency and
    a receiver for receiving said pulses and providing an output signal in response thereto, said receiver including a signal processor with a filter adapted to operate on an analog range gate applied to said pulses.
14. A method for sensing through walls including the steps of:
    transmitting a train of short pulses of electromagnetic energy, each pulse being stepped in frequency and
    receiving said pulses and providing an output signal in response thereto, said step of receiving further including the step of sampling said train at a centerline of a frequency spectrum of one of said pulses.
15. A radar system comprising:
    first means for receiving a train of pulses, each pulse being stepped in frequency;
    second means for filtering said train to pass a center spectral line of a frequency spectrum of one of said pulses; and
    third means for sampling said filtered pulse train and providing an output in response thereto.
16. The invention of claim 15 further including means for digitizing the output of said third means.
17. The invention of claim 15 wherein each of said pulses is less than or equal to 1 nanosecond in rise or fall time.
18. The invention of claim 15 wherein said second means includes means for filtering said pulses within an analog range gate.
19. The invention of claim 15 wherein said line is centered at an intermediate frequency of at least one of said pulses.
20. The invention of claim 19 wherein said second means includes means for passing signals within a pass band equal to twice a width of said at least one of said pulses.
21. A method including the steps of:
    receiving a train of pulses, each pulse being stepped in frequency;
    filtering said train to pass a center spectral line of a frequency spectrum of one of said pulses; and
    sampling said filtered pulse train and providing an output in response thereto.
22. The invention of claim 21 further including the step of digitizing said sampled filtered pulse train.
23. The invention of claim 21 wherein each of said pulses is less than or equal to 1 nanosecond in rise or fall time.
24. The invention of claim 21 wherein said filtering step further includes the step of filtering said pulses within an analog range gate.
25. The invention of claim 21 wherein said line is centered at an intermediate frequency of at least one of said pulses.
26. The invention of claim 25 wherein said filtering step includes the step of passing signals within a passband equal to twice a width of said at least one pulse.

* * * * *